P. DANCKWARDT.
PROCESS FOR THE PRODUCTION OF GASOLENE FROM CRUDE OIL.
APPLICATION FILED AUG. 27, 1917.
1,373,653.
Patented Apr. 5, 1921.
2 SHEETS—SHEET 2.
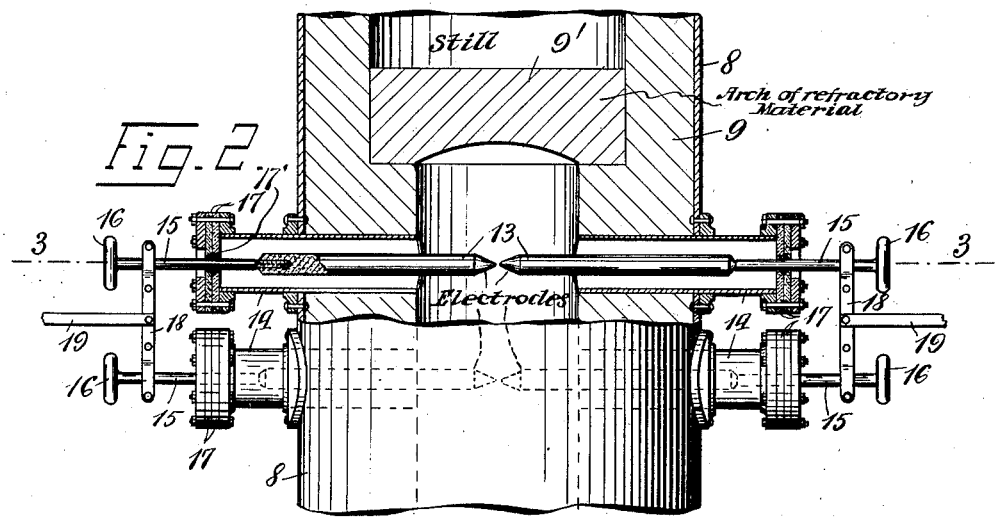
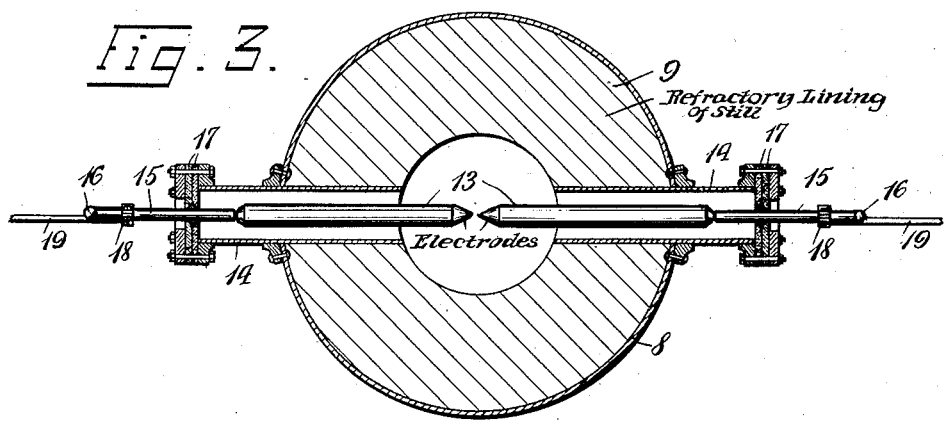
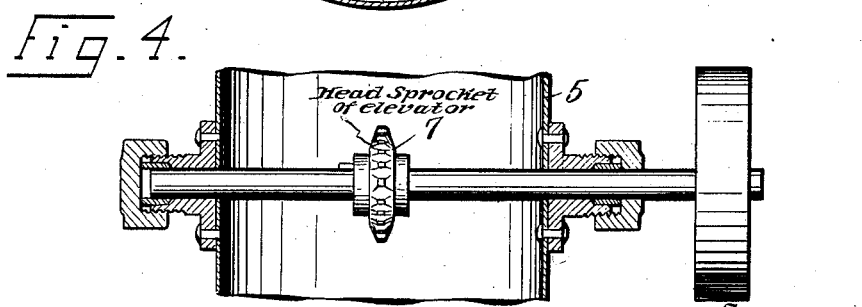
Inventor
Paul Danckwardt
By his Attorney

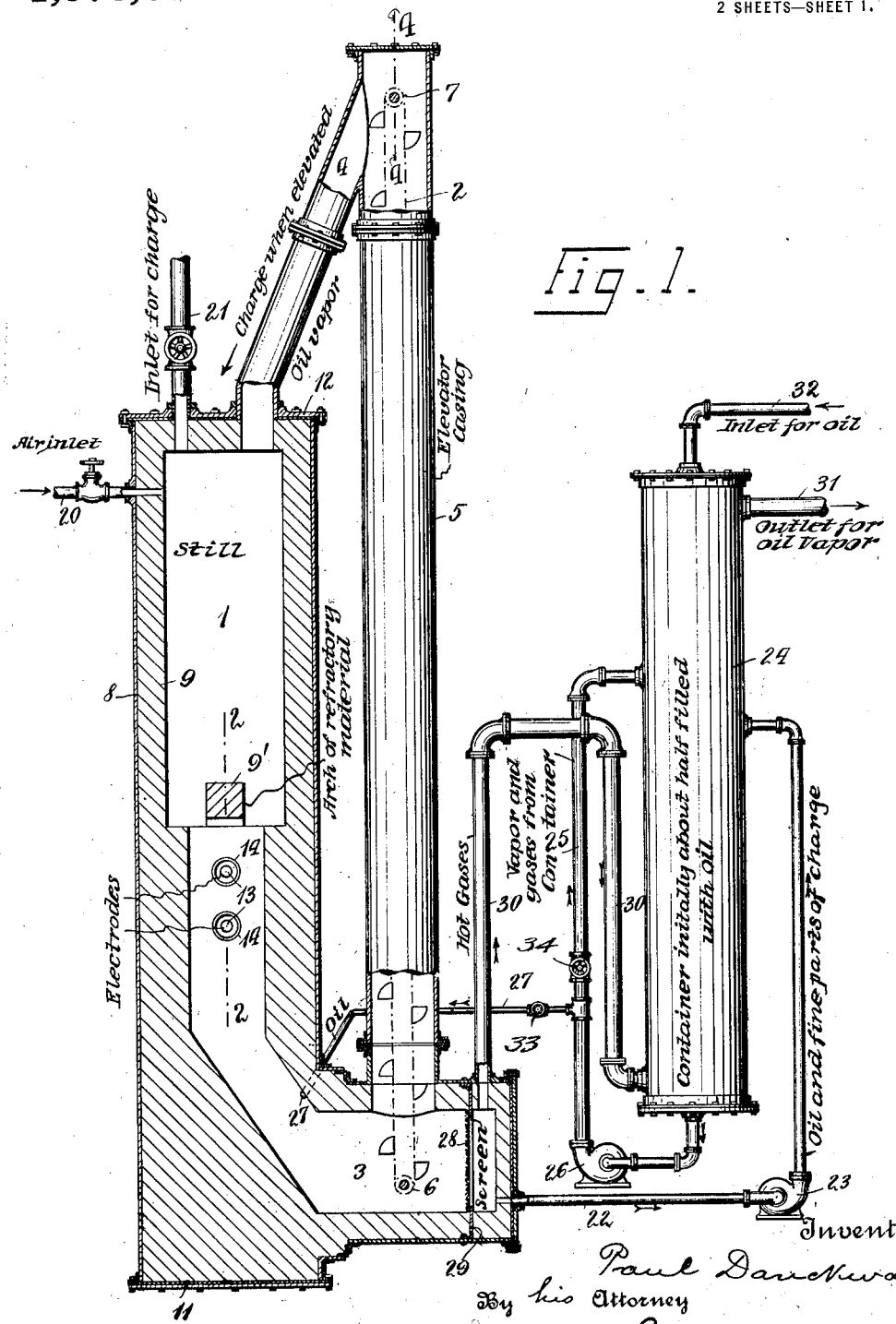

UNITED STATES PATENT OFFICE.

PAUL DANCKWARDT, OF DENVER, COLORADO.

PROCESS FOR THE PRODUCTION OF GASOLENE FROM CRUDE OIL.

1,373,653.   Specification of Letters Patent.   Patented Apr. 5, 1921.

Application filed August 27, 1917. Serial No. 188,305.

*To all whom it may concern:*

Be it known that I, PAUL DANCKWARDT, a citizen of the United States, and a resident of Denver, in the county of Denver and the State of Colorado, have invented certain new and useful Improvements in Processes for the Production of Gasolene from Crude Oil, of which the following is a specification.

The object of my invention is to produce gasolene directly from crude oil or intermediate products and similar oils, such as tar, etc., by subjecting the same to heat in the presence of aluminium oxid, one or more metal chlorids, and one or more metals. All may be introduced as such in the beginning of the operation, or compounds may be used that will produce the above substances while the process is going on. Thus, instead of the metal, I may introduce the oxid and carbon, and instead of aluminium oxid and the chlorids, I may use the residue forming during the progress of the reaction. This residue consists of a mixture of carbon and hydrated chlorids of aluminium and the other metals.

It has been long known that chlorids, and particularly aluminium chlorid, have the effect of changing the character of the oils when heated with them, they themselves being little changed and acting, therefore, as contact substances or catalyzers. However, they cannot be used but a short time, because soon they will lose their efficiency, in the way such processes are now carried out, and then it is necessary to separate the remaining oil from the chlorids and regenerate the latter or use a portion of fresh chlorids. Of course, such loss of time, and high expense, have been the cause that the chlorids have been used but very little since the first discovery was made some forty years ago. By the present invention, I avoid all these troubles. The chlorids are used over and over again, or in other words, they are continually regenerated in one and the same operation. This regeneration of the chlorids, which takes place by means of hydrochloric acid, created simultaneously along with other chemical compounds formed during the reaction, as the more detailed description of the chemical process later on will show, has the further advantage of allowing me to obtain much larger yields of gasolene and lighter oils from even the most unfavorable crudes and even from tar, on account of hydrogenization of the heavier and unsaturated parts of the oil taking place. Namely, the hydrogen of the hydrochloric acid, formed from the used up chlorids and some water which they have taken up from the crude oil, will *in statu nascendi* combine with the heavier parts of and transform them into oils of a lighter and more volatile character, and increase the output of gasolene. It is possible to continue this process so long as to convert 80% and more of the crude into gasolene, or the process may be interrupted at a certain time, and the remaining heavy oils may be converted by existing methods into the different grades of lubricating oils. This addition of hydrogen forms a prominent feature of my process.

Before entering into a more minute description of the chemical mechanism of the process, I will now first describe the apparatus I prefer to employ, reference being made to the accompanying drawing, in which—

Figure 1 shows in elevation, partly in section, an apparatus suitable for carrying out my improved process;

Fig. 2, is an elevation with parts in section on line 2—2 Fig. 1;

Fig. 3, is a horizontal section on line 3—3 Fig. 2;

Fig. 4, is a vertical section on line 4—4 Fig. 1.

In all the figures, the same numerals designate the same parts.

In Fig. 1 numeral 1 represents the still proper, while 2 is an elevator connected with the still at the bottom and top through the large lower pipe, or compartment 3 and the upper discharge pipe 4. The elevator 2, made of steel chain and perforated steel buckets, is inclosed in a steel pipe 5. The sprocket wheels 6 and 7 of the elevator are set on horizontal shafts leading through the lower wall of the upright pipe 5 and the lower horizontal pipe 3. The elevator is driven best by a pulley on the top shaft. The still 1 consists of an iron cylinder 8 closed by bottom plate 11 and top plate 12, and has an inside lining 9 of a suitable refractory material. The inside space slants toward the compartment 3. Through the walls of the still carbon electrodes 13 protrude, reaching outside into iron pipes 14. More electrodes than are shown in the drawings may be used, one above the other to heat a larger area of the still. Into the carbon electrodes are screwed copper rods 15, provided with handles 16. 17 represents insulating material placed between flanges and rings held together by bolts. Preferably a refractory arch or brick 9' is placed above the electrodes as shown, to protect them from the weight and impact of the descending material, it being understood that such material may pass down through openings left at each side of the said brick 9'. As there is a light gas pressure during the operation, and to prevent the escape of gas between the insulating material 17 and the copper rods 15, I place a packing 17' of asbestos or other suitable material between the beveled inner edges of the insulating rings 17, around the rods 15; this packing is compressed by the flanges and rings to form a tight joint around the rods. By means of cross bars and clamps 18 and 19 connection is made with the poles of a dynamo. 20 and 21 are pipe connections, 20 for the introduction of air and 21 is the inlet for the charge. The lower compartment 3 is provided with an outlet pipe 22 leading by way of the pump 23 to the scrubber or container 24, which holds the bulk of the oil to be treated. The bottom of this high cylindrical container is connected by means of pipe 25 and pump 26 with the upper part of the container, and through a branch pipe 27 with the interior of 3. Valves 33 and 34 allow the direction of the flow of the fluid to be controlled. Inside of compartment 3 a metal screen 28 is clamped to a circular angle ring 29. The vapor line 30 discharges near the bottom of container 24. The latter, closed on top and bottom has the outlet pipe 31 for vapors and fixed gases and the inlet pipe 32 for fresh oil.

In order to carry out my process in this apparatus, I introduce into it through 21 the charge consisting of a material rich in aluminium oxid (bauxite etc.) and carbon (coke graphite etc.) metal chlorid one or more metals or metal oxids (iron, nickel zinc, lead, copper, mercury, antimony, titanium, calcium, magnesium or other suitable ones), the chlorids of which are easily decomposed by heat in the presence of hydrogen or water vapor. The charge which fills the still 1 up to about the level of the pipe connection 20 ought to contain a high percentage of carbon so as to prevent it from caking at the temperature of the furnace. As an example, the following proportions may be employed:

85% of carbon, 5-10% of metal chlorid, and 5-10% of metal or metal oxid.

I then ignite some wood and charcoal (introduced through the pipe 21) on top of the charge and having started the blower connected with the pipe 20, let the blast play on the burning charge. When it is well ablaze, I close valve 21 and begin the operation of the elevator. This fills pipe 4 with the charge. The valve 21 being closed the blast is mostly forced downward through the charge and if container 24 has been about half filled with oil previously, the hot gases are forced through the oil by way of the pipe 30. As 80–85% of the charge consists of coke, the gases will not contain any dangerous amount of oxygen, as they have to pass through a long column of glowing coke which exerts its reducing effect on them. In a short time, the charge in 1 is brought to redness and the oil in 24 commences to boil. When this point has been reached, I lower the blast or cut it out altogether and start the dynamo, all connections having been made beforehand. The temperature soon rises to such a degree, that decomposition of the chlorids will begin, iron chlorid for instance breaking up into chlorin and iron and with any moisture present, forms hydrochloric acid and iron. This moisture, may for instance, come from the crude oil which, as stated above, contains water. It is however not necessary that the charge should contain any moisture originally, since some water may be formed during the treatment, from hydrocarbons and oxygen. Furthermore, the hydrogen required for the formation of hydrochloric acid might possibly be furnished, not by the decomposition of water, but by the decomposition of hydrocarbons. The presence or the formation of water (moisture) therefore does not appear to be essential to the formation of hydrochloric acid. At the same time, the current reduces some of the aluminium oxid. The liberated aluminium may or may not become alloyed with the iron or any other metal present. This depends on the amount of current and heat employed. I aim at just reducing part of the aluminium oxid and regulating the current and distance of the electrodes and the speed of the elevator accordingly. While the elevator is continually withdrawing charge from the bottom and dumping it into the top of the furnace or still, I start pump 26 and set valves 34 and 33 so that a good stream of oil is directed through 27 upon the hot descending charge at the bottom of 1. Soon the charge now containing principally reduced metal and carbon with the chlorids and hydrochloric acid intermingled with it, reaches the level of the foot of the elevator where it meets the stream of oil. Under the cooling effect of the oil the hydrochloric acid gas recombines with the metals, reforming chlorids of the metals. Chlorid of aluminium, however, is formed already from its oxid and hydrochloric acid in the presence of carbon at a level above the outlet. At the same time, the hydrogen set free exerts its affinity *in statu nascendi* upon the oil, and the chlorids, particularly the aluminium chlorids exert their influence as catalyzers. Both reactions assist each other, and while the reaction is not yet completed in 3, a large part of the crude oil is here already changed into compounds of relatively low boiling points. In the meanwhile, pump 23 has been started also. Thereby any oil and the finer part of the charge which is able to escape through the screen 28 is conveyed to the container 24. Here the ascending current of vapor and gases meets the descending mixture of oil and fine charge. At the temperature existing there, very favorable for the formation of chlorids, the remaining free hydrochloric acid combines with the metals forming more chlorids and completes the process of addition of hydrogen. These chlorids, together with carbon and fine oxid of aluminium and oil are continually sucked off through pump 26 and partially discharged into 3 through pipe 27, partly through pipe 25 back into container 24 both valves 33 and 34 being opened. At the same time, the elevator carries all the coarser charge together with some fine charge and as much oil as may adhere to the charge into the top of the still 1. Here it descends gradually and as it meets an increasing temperature the oil gradually distils off, escaping through pipe 4 and the elevator into compartment 3, where it mingles with the rest of the vapor formed at the point of junction of the descending charge and the oil injected through pipe 27. I aim to regulate the resistance to the passage of the vapor so that only a small part of any oil vapor formed above the hot zone is forced through it, because the high temperature between the electric poles would destroy a large part of it and break it up into carbon and hydrogen. The charge, in descending, therefore, ought to reach the hot zone where the chlorids, formed in the cooler parts of the apparatus, are again decomposed, " dry " that is, in a state free of oil. From this point on, the reactions follow again then in the same order as stated above.

Hence we can perceive that continually fresh aluminium chlorid is formed beginning at the hottest point of the still, while the other chlorids are formed only in those parts of the apparatus where oil is present in sufficient quantity to cool the charge down to the required point. For there is this great difference with regard to the formation of the different chlorids. Aluminium forms its chlorid best at a high temperature, and it is not necessary at all first, to reduce the oxid to the metallic state by means of the current. If the temperature and the atmosphere are favorable aluminium chlorid will form already at the poles according to the formula:

$$Al_2O_3 + C_3 + 6HCl = Al_2Cl_6 + 3CO + 6H.$$

When all the oxid which was introduced with the charge at the beginning of the process, has been changed into chlorid, any further chlorid is formed from the spent chlorid, which is brought up through the elevator continually. Such spent chlorid has become hydrated, that is, it has taken up oxygen and hydrogen from the water contained in any oil so that there is no need of injecting water or steam to enable the chlorid to become hydrated. This hydrated chlorid in descending toward the hot poles breaks up into aluminium oxid and hydrochloric acid and oxygen, which latter combines with carbon to CO. The aluminium oxid thus formed instantly under the influence of the electric current is partly reduced to metal, partly forms directly aluminium chlorid with the hydrochloric acid present. Any part of the aluminium reduced to the metallic state may by alloying with other metals present, escape with them downward to the zone where the oil enters and where all the metals are disintegrated to again form chlorids. While I have explained above that the water for hydrating the chlorid may be derived from the moisture contained in the oil treated, I wish to point out the possibility of the formation of water, during the treatment, from hydrocarbons and oxygen, so that the presence of moisture as such (that is, either in the oil treated or by adding water or steam) is not absolutely essential to the success of my process.

As to the amount of air that may be allowed to be blown into the still to assist the current in heating the charge, I will say that it seems to interfere to some degree in so far as it oxidizes the carbon poles if too great a quantity is employed. If, however, the apparatus is high enough for a perfect reduction, it only interferes with the ultimate condensation of the gasolene.

The container 24 I prefer to build high and I fill it only about half with oil, or two containers in series may be used. In this way, I can regulate the process so that the temperature at the outlet 31 does not rise much above 150° C. The product leaving 31 under these conditions is a well saturated oil of low gravity and a clean smell and clear as water. It can be marketed as a first class gasolene.

After a while, the oil in container 24 becomes thicker and heavier, though it was supposed that new oil is continually or intermittently added at the top. If it is desirable to work this oil mixed with heavy paraffin, into lubricating oil, it may be withdrawn and treated for that purpose by any existing method. The process, therefore, offers a means to produce gasolene directly from crude oil and can be used either to turn out only gasolene, or the process may be interrupted and the remaining oil worked into more renumerative products according to the market demands.

While the process is going on, naturally some fixed gas and carbon are formed, though in this respect, this process is superior to so called "cracking" processes employing higher temperatures and pressures. Nevertheless, the carbon thus accumulating and continually transported into the still, would at last choke the apparatus, if it was not consumed in some way or another. This is partly done by the chemical reactions of the process, particularly that between oxids and carbon and between water vapor and carbon. Should carbon nevertheless, accumulate, some blast will consume the excess easily.

From the above description, it is obvious that this process can be conducted in a variety of ways, without affecting the underlying principle. First we may use the blast only for starting to heat up the whole apparatus, then continue with electric heating alone. Or it may be continued more or less, or intermittently, while the current is used simultaneously. Often without the current the process will work, on blast alone, but the vapors are then mixed with a large amount of fixed gas and more difficult to condense. In such a case, also, the presence of steam demands that the furnace must be constructed considerably higher in order to insure a perfect reduction to $H_2$ and $CO$. I have made this latter species the object of a second patent, as some chlorids and metals are less unfavorably affected by the presence of steam than aluminium chlorid. Under certain conditions, the presence of steam may even be an important advantage, and my other specification illustrates such a case.

As mentioned above, there may also be made alterations in the charge, without interfering with the principle of the process. The main characteristic of the process is that a chlorid, or more generally a haloid salt, which can be decomposed at a high temperature and will reform at a lower temperature, is subjected in the presence of one or more metals (this metal may be the same as that forming the chlorid or not) to an alternately greater and less degree of heating, in the presence of crude oil or oil to be treated, thereby successively breaking up and reforming the chlorid or haloid salt. The accompanying intermediate formation of hydrochloric acid, I think, however, of the greatest importance, as that acid forms the means of creating hydrogen and is, therefore, the cause of the most important reaction of adding hydrogen *in statu nascendi* to the oil. The chlorids otherwise, and particularly aluminium chlorid, have only a catalyzing effect, but do not add any hydrogen from an outside source. The percentage of gasolene obtainable by means of such a process from an oil is considerably higher than that from a cracking process at high temperature and pressure. Results with different oils show but little variation. If the process is continued until all the oil is driven over, 70–90% light hydrocarbons are obtainable boiling at or below 150° C, the rest being transformed into fixed gases and carbon, which latter ultimately also appears in the form of carbon monoxid. The cost of heating by electricity, or at least partly, will perhaps seem high, but considering that the heat is applied internally and that it is utilized more economically and that it may be produced by means of the abundance of fixed gases the process furnishes, it will in reality be an advantage.

I claim:

1. The process of producing hydrocarbons of relatively low boiling points from hydrocarbons of relatively high boiling points, which consists in causing material containing such hydrocarbons of relatively high boiling points to react with a heated mixture of carbon, a haloid salt and a metal, removing the vapors formed and condensing all oils having relatively low boiling points separately from those of higher boiling points, substantially as and for the purpose described.

2. The process of producing hydrocarbons of relatively low boiling points from hydrocarbons of relatively high boiling points, which consists in causing material containing such hydrocarbons of relatively high boiling points to react with a heated mixture of carbon, a chlorid of a metal and a metal, removing the vapors formed and condensing all oils having relatively low boiling points separately from those of higher boiling points, substantially as and for the purpose described.

3. The process of producing gasolene from crude oil or similar products which consists in heating a mixture of carbon, metal chlorid and metal, at a temperature at which the chlorid could be decomposed, then heating the resulting product with oil at a lower temperature at which hydrochloric acid could combine with a metal and hydrogen could thus be set free, and then continually separating and condensing the hydrocarbons having relatively low boiling points thus produced, substantially as and for the purpose described.

4. The process of producing gasolene from crude oil or similar products which consists in heating a charge composed of a large percentage of carbon, a small percentage of aluminium oxid, a metal and a haloid salt the charge being in contact with the oil to be treated, causing decomposition of the haloid salt in or near the zone of highest temperature and reformation of same at points of less heating and under the cooling influence of the oil, allowing the oil to distil off, and condensing the oils of relatively low boiling points separately from those of higher boiling points.

5. The process of producing hydrocarbons of relatively low boiling points from hydrocarbons of higher boiling points, which consists in passing a charge composed of about 85% carbon, 5–10% metal chlorid and 5–10% metal, through a heated inclosed space, bringing the portions which are at a greater distance from the source of heat in contact with the oil to be treated, causing decomposition of the chlorid to take place in the hotter parts and consequent formation of hydrochloric acid by the combination of the chlorin thus set free with the hydrogen of the water contained in the oil, causing reformation of the chlorid in the cooler parts with consequent setting free of hydrogen, and addition of such hydrogen to the oil under the influence of the contact substance, and condensing the portions of oil of relatively low boiling points formed, separately, 6. The process of producing oils of relatively low boiling points from oils of higher boiling points, which consists in alternately causing decomposition and reformation of metal chlorid to take place by subjecting a mixture of metal chlorid, carbon and metal alternately to high and relatively low temperatures, while in contact with oil, allowing the oil to distil off by the heat of the charge and under the influence of the contact substances, leading the vapors through another portion of oil containing more charge, condensing all oils of a lower boiling point than 150° C. and returning all oils boiling above 150° C. to the system.

PAUL DANCKWARDT.